United States Patent
Pratt et al.

(10) Patent No.: US 10,590,795 B2
(45) Date of Patent: Mar. 17, 2020

(54) VANE ARM WITH TRI-WEDGE CIRCULAR POCKET

(71) Applicant: UNITED TECHNOLOGIES CORPORATION, Farmington, CT (US)

(72) Inventors: William S. Pratt, West Hartford, CT (US); Anand Nagaraj, Teaneck, NJ (US); Diane C. Kjelby, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 241 days.

(21) Appl. No.: 15/786,367

(22) Filed: Oct. 17, 2017

(65) Prior Publication Data

US 2019/0112940 A1    Apr. 18, 2019

(51) Int. Cl.
  *F01D 17/16*    (2006.01)
  *F01D 9/04*     (2006.01)
  *F02C 9/20*     (2006.01)

(52) U.S. Cl.
  CPC ............ *F01D 17/162* (2013.01); *F01D 9/041* (2013.01); *F01D 17/165* (2013.01); *F02C 9/20* (2013.01); *F05D 2220/32* (2013.01); *F05D 2230/60* (2013.01); *F05D 2240/12* (2013.01); *F05D 2260/79* (2013.01)

(58) Field of Classification Search
  CPC ............ F01D 17/111162; F01D 17/165; F01D 9/041; F02C 9/20; F05D 2230/60; F05D 2220/32; F05D 2240/12; F05D 2260/79
  USPC ....................................................... 415/160
  See application file for complete search history.

(56) References Cited

U.S. PATENT DOCUMENTS

| | | | | |
|---|---|---|---|---|
| 4,498,790 A * | 2/1985 | Fisher | ................... | F01D 17/162 384/296 |
| 4,979,874 A | 12/1990 | Myers | | |
| 5,024,580 A | 6/1991 | Olive | | |
| 5,492,446 A * | 2/1996 | Hawkins | ............... | F01D 17/162 411/116 |
| 5,947,681 A * | 9/1999 | Rochford | ............. | F01D 17/165 415/150 |
| 6,019,574 A * | 2/2000 | DiBella | ................. | F01D 17/162 415/148 |
| 7,011,494 B2 * | 3/2006 | Kies | ...................... | F01D 17/162 415/148 |

(Continued)

FOREIGN PATENT DOCUMENTS

| | | |
|---|---|---|
| FR | 2877059 | 4/2006 |
| FR | 2897120 | 8/2007 |

OTHER PUBLICATIONS

European Patent Office, European Search Report dated Feb. 11, 2019 in Application No. 18188988.2.

*Primary Examiner* — J. Todd Newton
(74) *Attorney, Agent, or Firm* — Snell & Wilmer, L.L.P.

(57) ABSTRACT

A vane arm may comprise a first end having a first surface and a second surface opposite the first surface. A vane stem aperture may be formed through the first end of the vane arm. The first surface may define a first perimeter of the vane stem aperture. The second surface may defines a second perimeter of the vane stem aperture. The second perimeter may comprise a circular or elliptical shape. A first wedge face and second wedge face may define a portion of the vane stem aperture.

15 Claims, 5 Drawing Sheets

(56) References Cited

U.S. PATENT DOCUMENTS

| | | | | |
|---|---|---|---|---|
| 7,198,461 B2* | 4/2007 | Burgmeier | F01D 17/162 | 415/160 |
| 7,344,355 B2* | 3/2008 | Wilshaw | F01D 17/162 | 415/160 |
| 7,360,990 B2* | 4/2008 | Barbe | F01D 17/162 | 384/296 |
| 7,524,165 B2* | 4/2009 | Bourgoin | F01D 17/162 | 415/160 |
| 7,530,784 B2* | 5/2009 | Ribassin | F01D 17/16 | 415/160 |
| 8,033,785 B2* | 10/2011 | Thermos | F01D 17/162 | 415/150 |
| 8,215,902 B2* | 7/2012 | Major | F01D 17/162 | 29/889.22 |
| 8,491,257 B2* | 7/2013 | Martin | F01D 17/16 | 415/163 |
| 8,651,803 B2* | 2/2014 | Jones | F01D 17/162 | 415/160 |
| 9,017,017 B2* | 4/2015 | Sausse | F01D 17/165 | 415/160 |
| 9,228,438 B2* | 1/2016 | Dube | F01D 17/162 | |
| 10,018,069 B2* | 7/2018 | Osborne | F01D 17/162 | |
| 2003/0143067 A1* | 7/2003 | Bouru | F01D 17/16 | 415/150 |
| 2004/0240989 A1* | 12/2004 | Willshee | F01D 17/162 | 415/148 |
| 2004/0240990 A1* | 12/2004 | Rockley | F01D 17/162 | 415/148 |
| 2005/0232758 A1* | 10/2005 | Wilshaw | F01D 17/162 | 415/160 |
| 2016/0032759 A1* | 2/2016 | Gasmen | F01D 17/162 | 415/148 |
| 2016/0123177 A1* | 5/2016 | Osborne | F01D 17/162 | 60/805 |
| 2016/0201499 A1* | 7/2016 | Pudvah | F04D 29/563 | |
| 2017/0081975 A1* | 3/2017 | Zagone | F01D 9/041 | |
| 2019/0264574 A1* | 8/2019 | Kjelby | F01D 17/162 | |

* cited by examiner

VANE ARM WITH TRI-WEDGE CIRCULAR POCKET

STATEMENT OF GOVERNMENT INTEREST

This disclosure was made with government support under Contract No. FA8626-16-C-2139 awarded by the United States Air Force. The government has certain rights in the disclosure.

FIELD

The present disclosure relates to vane structures within gas turbine engines and more specifically, to a vane arm having a tri-wedge circular pocket.

BACKGROUND

A gas turbine engine implements rotors and stators at various positions throughout the engine. The stators may include variable vane systems in which an angle of attack of the vane airfoils relative to airflow may be changed. Current vane arm geometries (e.g., vane arms comprising a claw feature) tend to have difficulty meeting the stress requirements associated with increased vane stem torque associated with increased engine temperatures and pressures.

SUMMARY

A vane arm is disclosed herein. In accordance with various embodiments, the vane arm may comprise a first end having a first surface and a second surface opposite the first surface, and a vane stem aperture formed through the first end of the vane arm. The first surface of the first end of the vane arm may define a first perimeter of the vane stem aperture. The second surface of the first end of the vane arm may define a second perimeter of the vane stem aperture. The second perimeter may comprise a first shape that is at least one of circular or elliptical. The first perimeter may comprise a second shape different from the first shape.

In various embodiments, a radially inward portion of the vane stem aperture may be defined, at least partially, by first wedge face, a second wedge face, and a third wedge face. The first wedge face, the second wedge face, and the third wedge face may each extend in a radially outward direction toward an axis extending radially through a central point of the vane stem aperture. The radially inward portion of the vane stem aperture may be further defined, at least partially, by a first vertical surface extending between the first wedge face and the second surface of the first end of the vane arm, a second vertical surface extending between the second wedge face and the second surface of the first end of the vane arm, a third vertical surface extending between the third wedge face and the second surface of the first end of the vane arm, and a fourth vertical surface located opposite the third vertical surface. The first vertical surface, the second vertical surface, the third vertical surface, and the fourth vertical surface may each be generally parallel to the axis extending radially through the central point of the vane stem aperture.

In various embodiments, a radially outward portion of the vane stem aperture may be defined, at least partially, by a first vertical surface extending between the first wedge face and the first surface of the first end of the vane arm, a second vertical surface extending between the second wedge face and the first surface of the first end of the vane arm, a third vertical surface extending between the third wedge face and the first surface of the first end of the vane arm, and a fourth vertical surface located opposite the third vertical surface. The first vertical surface, the second vertical surface, the third vertical surface, and the fourth vertical surface may each be generally parallel to the axis extending radially through the central point of the vane stem aperture.

In various embodiments, a first groove may be formed in the first vertical surface. A second groove may be formed in the second vertical surface. The first vertical surface, the first groove, the second vertical surface, the second groove, the third vertical surface, and the fourth vertical surface may define the first perimeter of the vane stem aperture. A diameter of the first perimeter may be greater than a diameter of the second perimeter as measured between the first groove and the second groove. In various embodiments, the vane arm may comprise titanium or a titanium alloy.

A variable vane assembly of a gas turbine engine is also disclosed herein. In accordance with various embodiments, the variable vane assembly may comprise a synchronization ring, a vane stem located through an aperture in the synchronization ring, and a vane arm coupling the vane stem to the synchronization ring. The vane arm may comprise a first end having a first surface and a second surface opposite the first surface, and a vane stem aperture formed through the first end of the vane arm. The first surface of the first end of the vane arm may define a first perimeter of the vane stem aperture. The second surface of the first end of the vane arm may define a second perimeter of the vane stem aperture. The second perimeter may comprise a first shape that is at least one of circular or elliptical. The first perimeter may comprise a second shape different from the first shape.

In various embodiments, a radially inward portion of the vane stem aperture may be defined, at least partially, by first wedge face and a second wedge face. The first wedge face and the second wedge face may contact the vane stem. The radially inward portion of the vane stem aperture may be further defined, at least partially, by a third wedge face. The third wedge face may extend in a radially outward direction toward an axis extending radially through a central point of the vane stem aperture. A gap may be located between the third wedge face and the vane stem.

In various embodiments, a radially outward portion of the vane stem aperture may be defined, at least partially, by a first vertical surface extending between the first wedge face and the first surface of the first end of the vane arm, a second vertical surface extending between the second wedge face and the first surface of the first end of the vane arm, a third vertical surface extending between the third wedge face and the first surface of the first end of the vane arm, and a fourth vertical surface located opposite the third vertical surface. The first vertical surface, the second vertical surface, the third vertical surface, and the fourth vertical surface may each be generally parallel to the axis extending radially through the central point of the vane stem aperture. A distance between the first vertical surface may limit a rotation of the vane arm relative to the vane stem to 1° or less.

In various embodiments, a first groove may be formed in the first vertical surface. A second groove may be formed in the second vertical surface. The first vertical surface, the first groove, the second vertical surface, the second groove, the third vertical surface, and the fourth vertical surface may define the first perimeter of the vane stem aperture.

A variable vane assembly is also disclosed herein. In accordance with various embodiments, the variable vane assembly may comprise a vane stem, and a vane arm coupled to the vane stem. The vane arm may comprise a first end having a first surface and a second surface opposite the first surface, and a vane stem aperture formed through the first end of the vane arm. The first surface of the first end of the vane arm may define a first perimeter of the vane stem aperture. The second surface of the first end of the vane arm may define a second perimeter of the vane stem aperture. The second perimeter may comprise a first shape that is at least one of circular or elliptical. A radially inward portion of the vane stem aperture may be defined, at least partially, by a first wedge face contacting the vane stem and a second wedge face contacting the vane stem.

In various embodiments, the radially inward portion of the vane stem aperture may be further defined, at least partially, by a third wedge face. The third wedge face may extend in a radially outward direction toward an axis extending radially through a central point of the vane stem aperture.

In various embodiments, the radially inward portion of the vane stem aperture may be further defined, at least partially, by a first vertical surface extending between the first wedge face and the second surface of the first end of the vane arm, a second vertical surface extending between the second wedge face and the second surface of the first end of the vane arm, a third vertical surface extending between the third wedge face and the second surface of the first end of the vane arm, and a fourth vertical surface located opposite the third vertical surface. The first vertical surface, the second vertical surface, the third vertical surface, and the fourth vertical surface may each be generally parallel to the axis extending radially through the central point of the vane stem aperture.

In various embodiments, a radially outward portion of the vane stem aperture may be defined, at least partially, by a first vertical surface extending between the first wedge face and the first surface of the first end of the vane arm, a second vertical surface extending between the second wedge face and the first surface of the first end of the vane arm, a third vertical surface extending between the third wedge face and the first surface of the first end of the vane arm, and a fourth vertical surface located opposite the third vertical surface. The first vertical surface, the second vertical surface, the third vertical surface, and the fourth vertical surface may each be generally parallel to the axis extending radially through the central point of the vane stem aperture

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. The term "axial," as used herein, refers to a direction along or parallel to the engine central longitudinal axis.

Figure 1:
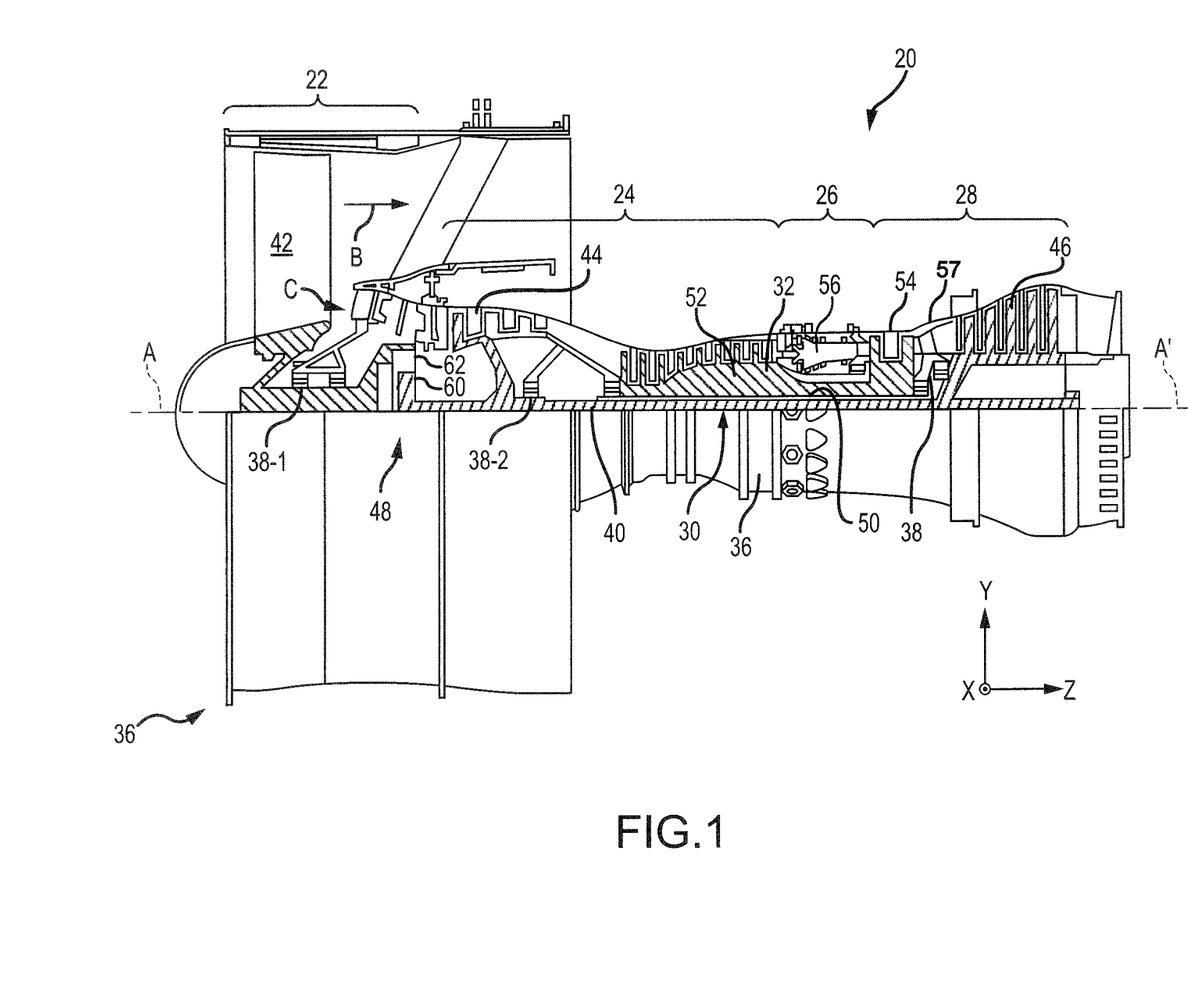
FIG. 1 illustrates a cross-sectional view of an exemplary gas turbine engine, according to various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In various embodiments, engines may include, for example, an augmentor section among other systems or features. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of vanes axially interspersed with the associated blade stages but non-rotating about engine central longitudinal axis A-A'. The vanes may be variable, meaning the angle of attack of the airfoil of vane may be variable relative to the airflow. The angle of attack of the vanes may be variable during operation, or may be fixable for operation, for instance, being variable during maintenance or construction and fixable for operation.

Figure 2:
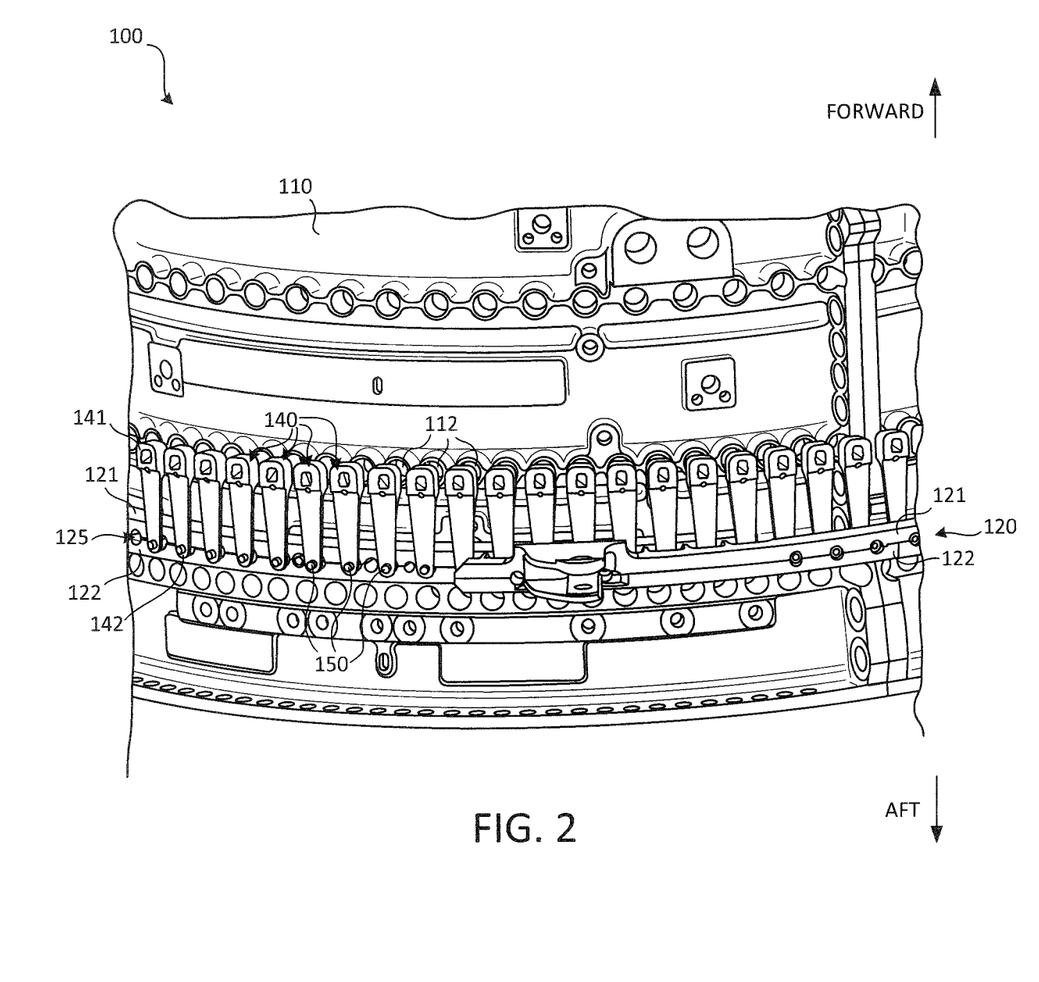
FIG. 2 illustrates an exemplary variable vane assembly, in accordance with various embodiments.

With reference to FIG. 2, a variable vane assembly 100 having a synchronization ring 120 is illustrated. Synchronization ring 120 includes a first ring portion 121 and a second ring portion 122 that are detachably coupled together to jointly define a plurality of cylindrical bores 125 of the synchronization ring 120. Said differently, first ring portion 121 may be a forward ring portion and the second ring portion 122 may be an aft ring portion (e.g., two separable axial halves that jointly form the synchronization ring 120). Synchronization ring 120 may link a plurality of vanes to an actuator. Thus, one or more actuators may be mechanically coupled to synchronization ring 120, which is mechanically coupled to vane stems 134 of a plurality of vanes (with momentary reference to FIGS. 5A and 5B) via a corresponding plurality of vane arms 140. Therefore, in response to actuating the actuator(s), the synchronization ring 120 rotates around and relative to a case 110 (e.g., a compressor case or a turbine case), thereby causing the attack angle of the vanes, which are located radially inward of the compressor case 110, to be simultaneously adjusted.

The case 110, around which the synchronization ring 120 is situated, defines a plurality of vane stem slots 112 that are circumferentially distributed around the case 110 and that extend radially through the case 110. Vanes of gas turbine engine 20 (FIG. 1) may located radially inward of case 110. The vanes located inward of case 110 may include a vane body and a vane stem 134 (FIG. 5A), according to various embodiments. The vane body may disposed on a radially inward side of the case 110 and the vane stem 134 may extend radially outward through one of the plurality of vane stem slots 112.

Figure 5A:
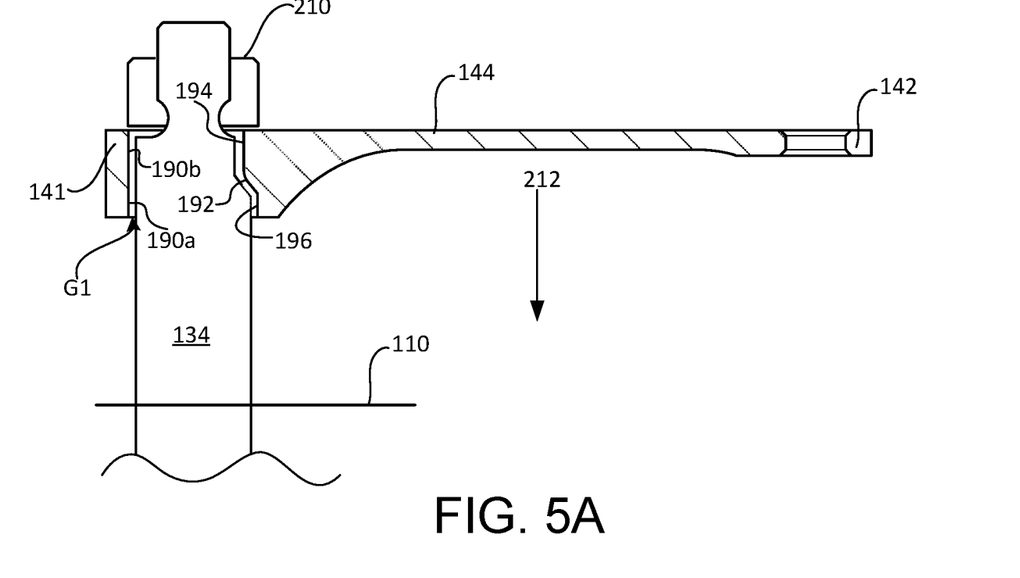
FIGS. 5A and 5B illustrate cross-sectional view of a vane stems secured to a vane arm comprising a tri-wedge circular pocket, in accordance with various embodiments.

With combined reference to FIG. 2 and FIG. 5A, a radially outward end of the vane stem 134 may protrude from the vane stem slots 112 defined in the case 110, and this radially outward end of the vane stem 134 is coupled to a vane arm 140, according to various embodiments. In various embodiments, a fastener 210 couples vane arm to vane stem 134. Fastener 210 may comprise a nut, bolt, clip, or other suitable attachment component. The vane arm 140 may include a first end 141 and a second end 142. The radially outward end of the vane stem 134 may be coupled to the first end 141, and a radially extending pin 150 (FIG. 2) may be coupled to the second end 142. In various embodiments, the vane arm 140 extends substantially perpendicular to the vane stem 134 (e.g., perpendicular to the radial direction). As used herein, "substantially perpendicular" means within five degrees of perpendicular. In various embodiments, the pin 150 extends radially through one of the plurality of cylindrical bores 125 that is jointly formed by the first and second ring portions 121, 122.

In various embodiments, the pin 150 is at least one of rotatably coupled to the second end 142 of the vane arm 140 or rotatable within the one of the plurality of cylindrical bores 125. Said differently, the pin 150 may be coupled in rotatable engagement with the second end 142 of the vane arm 140 and/or the pin 150 may extend through a cylindrical bore 125 jointly formed by the first and second ring portions 121, 122.

Figure 3A:
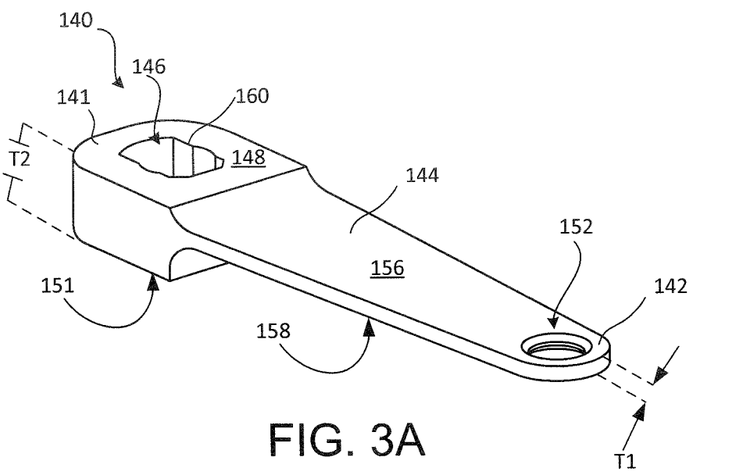
FIGS. 3A, 3B, and 3C illustrate a vane arm comprising a tri-wedge circular pocket, in accordance with various embodiments.

In various embodiments, and with reference to FIG. 3A, the first end 141 of the vane arm 140 comprises opposing surfaces 148 and 151. Surface 148 may be a radially outward surface, oriented generally away from the vane and case 110, with momentary reference to FIG. 2. Surface 151 may be a radially inward surface, oriented generally toward from the vane and case 110, with momentary reference to FIG. 2. First end 141 may define a vane stem aperture 146. Vane stem aperture 146 may extend completely through first end 141 (i.e., from surface 148 to surface 151). A connection portion 144 of vane arm 140 extends between first end 141 and second end 142. Connection portion 144 includes opposing surfaces 156 and 158. A radially thickness T1 of connection portion may be less than a radial thickness T2 of first end 141. In various embodiments, the portion of surface 156 proximate to first end 141 may slope, or curve radially outward, to meet first surface 148. The portion of surface 158 proximate to first end 141 may slope, or curve radially inward, to meet surface 151. Second end 142 of vane arm 140 may define a pin aperture 152. Pin aperture 152 may extend completely through second end 142 (i.e., from surface 156 to surface 158).

Vane arm 140 may comprise a metal or metal alloy. For example, vane arm 140 may comprise titanium, nickel, copper, silver, steel, and/or alloys thereof. In various embodiments, vane arm 140 is comprised of titanium. Vane arm 140 may be formed by electrical discharge machining (EDM), casting, punching, laser drilling, or other suitable manufacturing process.

Figure 3B:
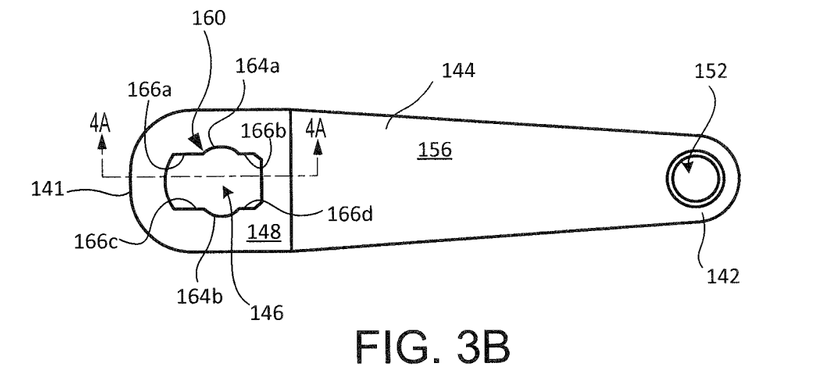

With reference to FIG. 3B a radially inward looking view of vane arm 140 is illustrated, in accordance with various embodiments. Surface 148 may define a radially outward perimeter 160 of vane stem aperture 146. In various embodiments, radially outward perimeter 160 comprises a generally rectangular shape with two semi-circular stud clearances 164a and 164b formed in opposing sides of radially outward perimeter 160. In various embodiments, radially outward perimeter 160 includes four flat, or planar, anti-rotation surfaces 166a, 166b, 166c, and 166d. Radially outward perimeter 160 may be configured to complement a shape or geometry of vane stem 134, with momentary reference to FIG. 5A.

Figure 3C:
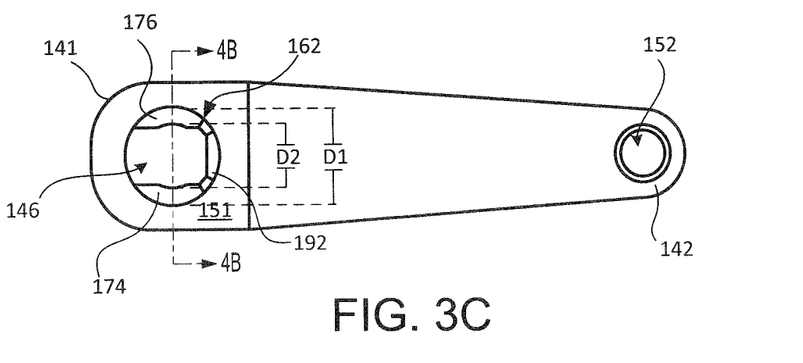

With reference to FIG. 3C a radially outward looking view of vane arm 140 is illustrated, in accordance with various embodiments. Surface 151 may define a radially inward perimeter 162 of vane stem aperture 146. The geometry of radially inward perimeter 162 may be different from the geometry of radially inward perimeter 160. In various embodiments, radially inward perimeter 162 comprises a generally circular or annular shape. A diameter or width D1 of radially inward perimeter 162 may be greater than a diameter or width D1 of radially outward perimeter 160 as measured at stud clearances 164a and 164b.

Figure 4A:
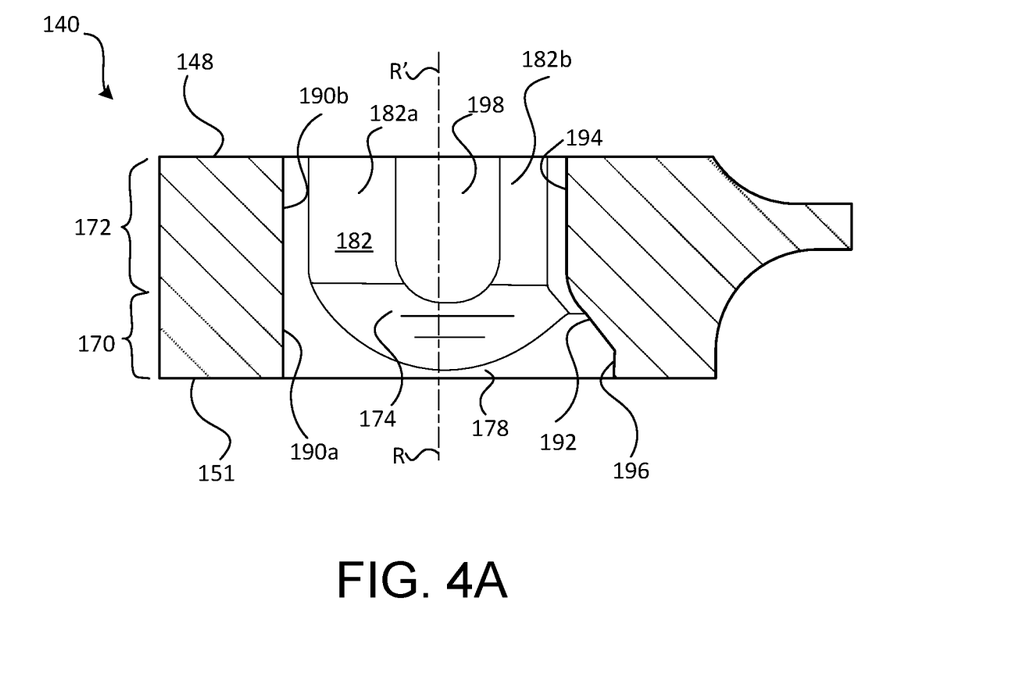
FIGS. 4A and 4B illustrate cross-section views of a vane arm tri-wedge circular pocket, in accordance with various embodiments.
Figure 4B:
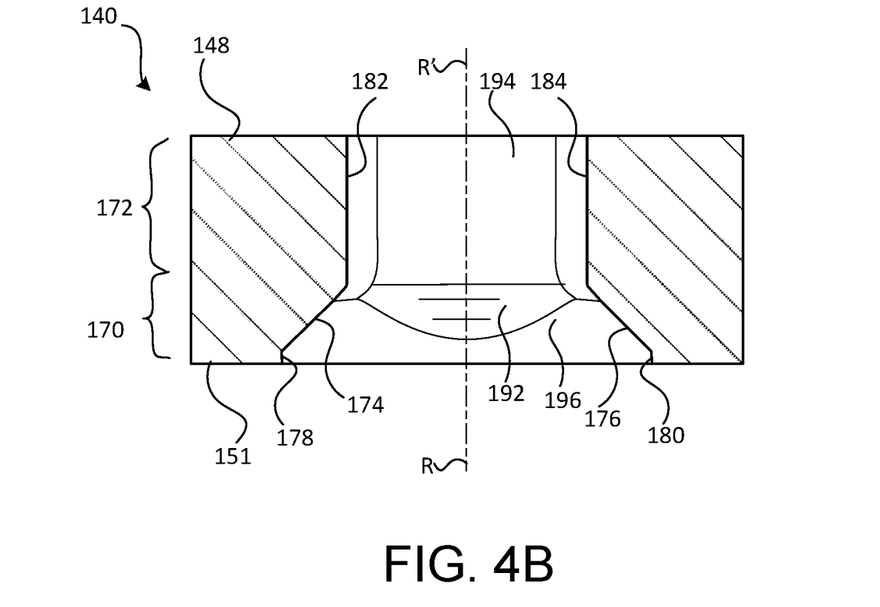

With combined reference to FIG. 3C, FIG. 4A, and FIG. 4B, a radially inward portion 170 of vane stem aperture 146 may comprise a generally frustoconical shape and may be defined, at least partially, by sloped or angled surfaces 174, 176, and 192 (also referred to herein as wedge faces) and vertical surfaces 178, 180, 190a, and 196. Wedge faces 174, 176, and 192 may extend from vertical surfaces 178, 180, and 196 respectively, toward an axis R-R' extending radially through a central point of vane stem aperture 146. Axis R-R' may be substantially perpendicular to engine central longitudinal axis A-A'. As used herein, "substantially perpendicular" means within five degrees of perpendicular. Vertical surfaces 178, 180, and 196 may extend, respectively, from wedge faces 174, 176, and 192 to surface 151. Vertical surfaces 178, 180, 190a, and 196 may be substantially parallel to axis R-R'. As used herein, "substantially parallel" means within five degrees of parallel.

A radially outward portion 172 of vane stem aperture 146 may be defined, at least partially, by vertical surface 182, 184, 190b, and 194. Vertical surfaces 182, 184, 190b, and 194 may be substantially parallel to axis R-R'. As used herein, "substantially parallel" means within five degrees of parallel. Vertical surfaces 182, 184, and 194 may extend, respectively, between wedge faces 174, 176, and 192 and first surface 148. Wedge face 192 and vertical surfaces 194 and 196 may be located at an aft end of vane stem aperture 146. Vertical surfaces 190a and 190b may be located at a forward end of vane stem aperture 146.

A groove 198 may be formed in vertical surface 182. Groove 198 may define/coincide with stud clearance 164a. A portion 182a of vertical surface 182 may be located between groove 198 and forward vertical surface 190b. Portion 182a may define/coincide with anti-rotation surface 166a. A portion 182b of vertical surface 182 may be located between groove 198 and forward vertical wall 190b. Portion 182b may define/coincide with anti-rotation surface 166b. While FIG. 4A illustrates vertical surface 182 and groove 198, it should be understood that vertical surface 184, with momentary reference to FIG. 4B, may include the elements and functionalities as described herein with respect to surface 182. Stated differently, a groove similar to groove 198 may be formed in vertical surface 184 and may define/coincide with stud clearance 164b, and a first portion of vertical surface 184 proximate vertical surface 194 may define/coincide with anti-rotation surface 166d, and a second portion of vertical surface 184 between vertical surface 190b and the groove may define/coincide with anti-rotation surface 166c.

Figure 5B:
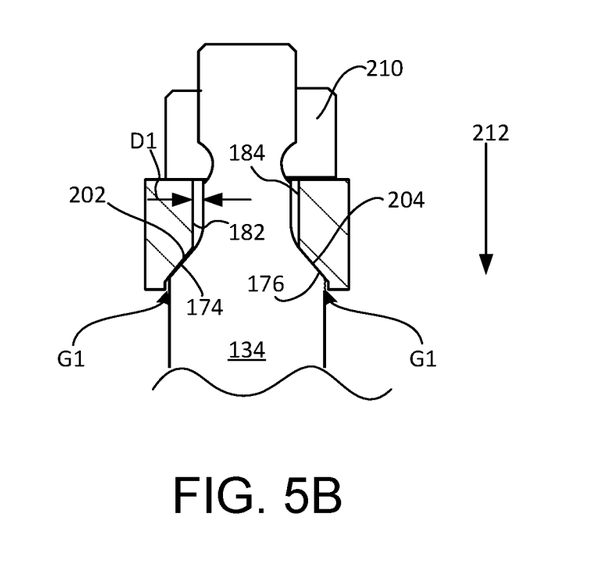

With reference to FIG. 5B, wedge faces 174 and 176 may be configured to complement and contact angled walls 202 and 204, respectively, of vane stem 134. For example, fastener 210 may engage vane stem 134 and travel toward vane arm 140. Securing fastener 210 to vane stem 134 may cause vane arm 140 to move radially inward toward case 110 (with momentary referent to FIG. 2). Fastener 210 may apply a pressure to vane arm 140 in the direction of arrow 212. The pressure applied by fastener 210 may cause wedge faces 174 and 176 to contact and press against walls 202 and 204 of vane stem 134. Fastener 210 and walls 202 and 204 may force wedge faces 174 and 176 in to a compressed, or "preloaded" state. In various embodiments, wedge faces 174 and 176 being compressed may cause the shape of radially inward perimeter 162 to transform from a generally circular shape to a generally oval or elliptical shape.

With combined reference to FIG. 3C and FIGS. 5A and 5B, radially inward perimeter 162 may be configured such that a gap or space G1 exists between vane stem 134 and surface 151. Stated differently, vertical surfaces 178, 180, 190a, and 196 may be configured such that vane stem 134 does not contact vertical surfaces 178, 180, 190a, and 196. In various embodiments, radially outward portion 172 of vane stem apertures is configured such that vane stem 134 does not contact vertical surfaces 182, 184, wedge face 192 and vertical surfaces 190a, 190b, 194, and 196 are configured such that under normal operating conditions, vane stem 134 does not contact wedge face 192 or vertical surfaces 190a, 190b, 194, and 196. Stated differently, during normal operating conditions, only wedge faces 174 and 176 will contact vane stem 134. In this regard, torque is transferred between vane stem 134 and vane arm 140 through wedge faces 174 and 176. The generally circular or elliptical shape of radially inward perimeter 162 and generally frustoconical shape of radially inward portion 170 tends to distribute hoop stress more evenly throughout the first end 141, and tends to avoid areas of increased stress concentration.

The features of vane arm 140 may allow control of vane arm 140 to be retained should fastener 210 be lost due to, for example, an engine surge or other catastrophic event. For example, if fastener 210 is not present, anti-rotation surfaces 166a, 166b, 166c, and 166d tend to prevent vane arm 140 from rotating about vane stem 134. For example, anti-rotation surfaces 166a, 166b, 166c, and 166d may be configured to allow vane arm 140 to rotate 1° or less before contacting vane stem 134. In various embodiments, anti-rotation surfaces 166a, 166b, 166c, and 166d may be configured to allow vane arm 140 to rotate 0.5° or less before anti-rotation surfaces 166a, 166b, 166c, and 166d contact vane stem 134. Stated differently, a distance D1 between vane stem 134 and vertical surfaces 182 and 184 and may be selected to restrict rotation of vane arm 140 to 1 or less, or 05 or less. Preventing vane arm 140 from rotating tends to reduce a likelihood that vane arm with disengage from vane stem 134.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A vane arm comprising:
   a first end having a first surface and a second surface opposite the first surface; and
   a vane stem aperture formed through the first end of the vane arm, wherein the first surface of the first end of the vane arm defines a first perimeter of the vane stem aperture, and wherein the second surface of the first end of the vane arm defines a second perimeter of the vane stem aperture, wherein the second perimeter comprises a first shape that is at least one of circular or elliptical, and wherein the first perimeter comprises a second shape different from the first shape, wherein a radially inward portion of the vane stem aperture is defined, at least partially, by a first wedge face, a second wedge face, and a third wedge face, and wherein the first wedge face, the second wedge face, and the third wedge face each extends toward an axis extending radially through a central point of the vane stem aperture, and
   wherein a radially outward portion of the vane stem aperture is defined, at least partially, by:
      a first vertical surface extending between the first wedge face and the first surface of the first end of the vane arm;
      a second vertical surface extending between the second wedge face and the first surface of the first end of the vane arm;
      a third vertical surface extending between the third wedge face and the first surface of the first end of the vane arm; and
      a fourth vertical surface located opposite the third vertical surface and extending from the first surface of the first end of the vane arm to the second surface of the first end of the vane arm, wherein the first vertical surface, the second vertical surface, the third vertical surface, and the fourth vertical surface are each generally parallel to the axis extending radially through the central point of the vane stem aperture.

2. The vane arm of claim 1, wherein the radially inward portion of the vane stem aperture is further defined, at least partially, by:
   a fifth vertical surface extending between the first wedge face and the second surface of the first end of the vane arm;
   a sixth vertical surface extending between the second wedge face and the second surface of the first end of the vane arm;
   a seventh vertical surface extending between the third wedge face and the second surface of the first end of the vane arm; and
   the fourth vertical surface, wherein the fourth vertical surface is located opposite the seventh vertical surface, and wherein the fifth vertical surface, the sixth vertical surface, and the seventh vertical surface are each generally parallel to the axis extending radially through the central point of the vane stem aperture.

3. The vane arm of claim 1, further comprising:
   a first groove formed in the first vertical surface; and
   a second groove formed in the second vertical surface.

4. The vane arm of claim 3, wherein the first vertical surface, the first groove, the second vertical surface, the second groove, the third vertical surface, and the fourth vertical surface define the first perimeter of the vane stem aperture.

5. The vane arm of claim 4, wherein a diameter of the second perimeter is greater than a diameter of the first perimeter, the diameter of the first perimeter being measured between the first groove and the second groove.

6. The vane arm of claim 1, wherein the vane arm comprises titanium or a titanium alloy.

7. A variable vane assembly of a gas turbine engine, comprising:
   a synchronization ring;
   a vane stem located through an aperture in the synchronization ring; and
   a vane arm coupling the vane stem to the synchronization ring, the vane arm comprising:
      a first end having a first surface and a second surface opposite the first surface; and
      a vane stem aperture formed through the first end of the vane arm, wherein the first surface of the first end of the vane arm defines a first perimeter of the vane stem aperture, and wherein the second surface of the first end of the vane arm defines a second perimeter of the vane stem aperture, wherein the second perimeter comprises a first shape that is at least one of circular or elliptical, and wherein the first perimeter comprises a second shape different from the first shape;
      wherein a radially inward portion of the vane stem aperture is defined, at least partially, by a first wedge face, a second wedge face, and a third wedge face, and wherein the first wedge face and the second wedge face contact the vane stem, and wherein third wedge face extends toward an axis extending radially through a central point of the vane stem aperture, and wherein a gap is located between the third wedge face and the vane stem.

8. A variable vane assembly of claim 7, wherein a radially outward portion of the vane stem aperture is defined, at least partially, by:
   a first vertical surface extending between the first wedge face and the first surface of the first end of the vane arm;
   a second vertical surface extending between the second wedge face and the first surface of the first end of the vane arm;
   a third vertical surface extending between the third wedge face and the first surface of the first end of the vane arm; and
   a fourth vertical surface located opposite the third vertical surface, wherein the first vertical surface, the second vertical surface, the third vertical surface, and the fourth vertical surface are each generally parallel to the axis extending radially through the central point of the vane stem aperture.

9. The variable vane assembly of claim 8, wherein a distance between the first vertical surface and the vane stem limits a rotation of the vane arm relative to the vane stem to 1° or less.

10. The variable vane assembly of claim 8, further comprising:
    a first groove formed in the first vertical surface; and
    a second groove formed in the second vertical surface.

11. The variable vane assembly of claim 10, wherein the first vertical surface, the first groove, the second vertical surface, the second groove, the third vertical surface, and the fourth vertical surface define the first perimeter of the vane stem aperture.

12. A variable vane assembly, comprising:
    a vane stem; and
    a vane arm coupled to the vane stem, the vane arm comprising:
       a first end having a first surface and a second surface opposite the first surface; and
       a vane stem aperture formed through the first end of the vane arm, wherein the first surface of the first end of the vane arm defines a first perimeter of the vane stem aperture, and wherein the second surface of the first end of the vane arm defines a second perimeter of the vane stem aperture, wherein the second perimeter comprises a first shape that is at least one of circular or elliptical, and wherein a radially inward portion of the vane stem aperture is defined, at least partially, by a first wedge face contacting the vane stem and a second wedge face contacting the vane stem, wherein the first wedge face and the second wedge face each extend toward an axis extending radially through a central point of the vane stem aperture.

13. The variable vane assembly of claim 12, wherein the radially inward portion of the vane stem aperture is further defined, at least partially, by a third wedge face, wherein the third wedge face extends toward the axis extending radially through a central point of the vane stem aperture.

14. The variable vane assembly of claim 13, wherein the radially inward portion of the vane stem aperture is further defined, at least partially, by:
    a first vertical surface extending between the first wedge face and the second surface of the first end of the vane arm;
    a second vertical surface extending between the second wedge face and the second surface of the first end of the vane arm;
    a third vertical surface extending between the third wedge face and the second surface of the first end of the vane arm; and
    a fourth vertical surface located opposite the third vertical surface, wherein the first vertical surface, the second vertical surface, the third vertical surface, and the fourth vertical surface are each generally parallel to the axis extending radially through the central point of the vane stem aperture.

15. The variable vane assembly of claim 14, wherein a radially outward portion of the vane stem aperture is defined, at least partially, by:
    a fifth vertical surface extending between the first wedge face and the first surface of the first end of the vane arm;
    a sixth vertical surface extending between the second wedge face and the first surface of the first end of the vane arm;
    a seventh vertical surface extending between the third wedge face and the first surface of the first end of the vane arm; and
    the fourth vertical surface, wherein the fourth vertical surface is located opposite the seventh vertical surface, and wherein the fifth vertical surface, the sixth vertical surface, and the seventh vertical surface are each generally parallel to the axis extending radially through the central point of the vane stem aperture.

* * * * *